(12) United States Patent
Saito et al.

(10) Patent No.: US 11,831,987 B2
(45) Date of Patent: Nov. 28, 2023

(54) CONTROL APPARATUS, IMAGING APPARATUS, LENS APPARATUS, AND CONTROL METHOD FOR IMAGE BLUR CORRECTION SYSTEM

(71) Applicant: CANON KABUSHIKI KAISHA, Tokyo (JP)

(72) Inventors: Junichi Saito, Kanagawa (JP); Masafumi Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 17/696,568

(22) Filed: Mar. 16, 2022

(65) Prior Publication Data

US 2022/0321785 A1 Oct. 6, 2022

(30) Foreign Application Priority Data

Mar. 30, 2021 (JP) ................................ 2021-058481

(51) Int. Cl.
*H04N 23/68* (2023.01)
*H04N 23/667* (2023.01)

(52) U.S. Cl.
CPC ......... *H04N 23/687* (2023.01); *H04N 23/667* (2023.01)

(58) Field of Classification Search
CPC .............. H04N 23/687; H04N 23/667; H04N 23/6812; H04N 23/663
USPC ......................................................... 348/55
See application file for complete search history.

(56) References Cited

U.S. PATENT DOCUMENTS

| 6,091,902 A * | 7/2000 | Komatsuzaki ......... G02B 7/102 396/60 |
| 8,743,218 B2 * | 6/2014 | Tsuchida .................. G03B 5/00 348/208.4 |
| 11,212,430 B2 * | 12/2021 | Kawai ..................... G03B 17/14 |
| 11,678,055 B2 * | 6/2023 | Kawanago ........... H04N 23/685 348/208.4 |
| 2021/0235017 A1 * | 7/2021 | Naito .................... H04N 23/951 |
| 2022/0256086 A1 * | 8/2022 | Fujikawa ............... H04N 23/61 |
| 2022/0417436 A1 * | 12/2022 | Konishi ............. H04N 23/6815 |
| 2023/0136616 A1 * | 5/2023 | Narita .................... G06V 10/25 348/207.99 |

FOREIGN PATENT DOCUMENTS

JP 2015141391 A 8/2015

* cited by examiner

*Primary Examiner* — Helen Shibru
(74) *Attorney, Agent, or Firm* — CANON U.S.A., INC. IP Division

(57) ABSTRACT

A control apparatus includes a selection unit that selects a drive mode for first and second correction units based on a focal length, and a control unit that drives the correction units in the selected mode. The first correction unit moves an optical element. The second correction unit moves a sensor. The selection unit selects a first mode if the focal length is a first value, and selects a second mode if the focal length is a second value larger than the first value. With the first mode selected, if a shake amount is a threshold or less, the first correction unit is driven based on the shake amount, and if the shake amount is larger than the threshold, the correction units are driven based on the shake amount. With the second mode selected, the correction units are driven based on the shake amount and a drive ratio.

12 Claims, 6 Drawing Sheets

FIG.5A
LENS-SIDE PRIORITY CONTROL

FIG.5B
COORDINATION CONTROL

FIG.6

CONTROL APPARATUS, IMAGING APPARATUS, LENS APPARATUS, AND CONTROL METHOD FOR IMAGE BLUR CORRECTION SYSTEM

BACKGROUND

Technical Field

The aspect of the embodiments relates to a control apparatus, an imaging apparatus, a lens apparatus, and a control method for an image blur correction system. The aspect of the embodiments relates more particularly to a control apparatus that controls image blur correction units configured to drive and control an image sensor and an imaging optical system, respectively.

Description of the Related Art

Japanese Patent Application Laid-Open No. 2015-141391 discusses a technique for preventing image quality degradation of a digital camera system including a camera body and a lens apparatus. According to the technique, image blur correction units respectively included in the camera body and the lens apparatus are used to prevent the image quality degradation due to a shake applied to the camera body. More specifically, the camera-side image blur correction unit included in the camera body moves an image sensor in a plane perpendicular to an optical axis, based on the amount of shake applied to the camera body. This enables obtaining a large image blur correction angle that cannot be acquired simply by moving a correction optical system (a blur correction lens group), which is a part of an imaging optical system, in the plane perpendicular to the optical axis, thereby coping with a larger shake. In this specification, the correction angle refers to the shake angle that can be corrected by each image blur correction unit.

SUMMARY

According to an aspect of the embodiments, a control apparatus includes at least one processor and a memory coupled with the at least one processor that when executed by the processor, cause the processor to function as a selection unit configured to acquire information indicating a focal length of an optical system, and select a drive mode for a first correction unit and a second correction unit from among a plurality of drive modes including a first drive mode and a second drive mode based on the information indicating the focal length, the first correction unit being configured to move an optical element included in the optical system to change a direction of an optical axis of the optical system, the second correction unit being configured to move a sensor in a plane perpendicular to the optical axis, the sensor being configured to capture a subject image formed by light passing through the optical system, and a control unit configured to drive the first correction unit and the second correction unit in the selected drive mode. The selection unit selects the first drive mode in a case where the focal length is a first value, and selects the second drive mode in a case where the focal length is a second value larger than the first value. In a case where the first drive mode is selected and a shake amount of an imaging apparatus including the sensor is equal to or smaller than a first threshold value, the control unit drives and controls the first correction unit based on the shake amount, and in a case where the first drive mode is selected and the shake amount is larger than the first threshold value, the control unit drives and controls the first correction unit and the second correction unit based on the shake amount. In a case where the second drive mode is selected, the control unit drives and controls the first correction unit and the second correction unit based on the shake amount and a predetermined drive ratio.

Further features of the disclosure will become apparent from the following description of exemplary embodiments with reference to the attached drawings.

DESCRIPTION OF THE EMBODIMENTS

An exemplary embodiment of the disclosure will be described in detail below with reference to the accompanying drawings. The following exemplary embodiment does not limit the disclosure according to the scope of the claims. Although a plurality of features is described in the following exemplary embodiment, not all of the plurality of features are indispensable to the disclosure, and the plurality of features may be combined as appropriate. In the accompanying drawings, same or similar components are assigned the same reference numerals, and redundant descriptions thereof will be omitted.

In the camera system discussed in Japanese Patent Application Laid-Open No. 2015-141391, in a case where the lens apparatus includes the imaging optical system having a short focal length, i.e., in a case where the lens apparatus is a wide-angle lens, the image blur correction angle of the camera-side image blur correction unit configured to drive the image sensor is larger than that in a case where the lens apparatus includes the imaging optical system having a long focal length. However, in a case where the lens apparatus is a wide-angle lens, moving the image sensor using the camera-side image blur correction unit can cause a difference in suitable image blur correction amount between a central portion of the image sensor (a position where light passing through the optical axis is incident) and a peripheral portion of the image sensor (a region away from the optical axis). It has been clarified that the image quality degradation due to the influence of image blur is reduced at the central portion but the reduction is limited at the peripheral portion. This aspect will be described in detail with reference to FIG. 6.

Figure 6:
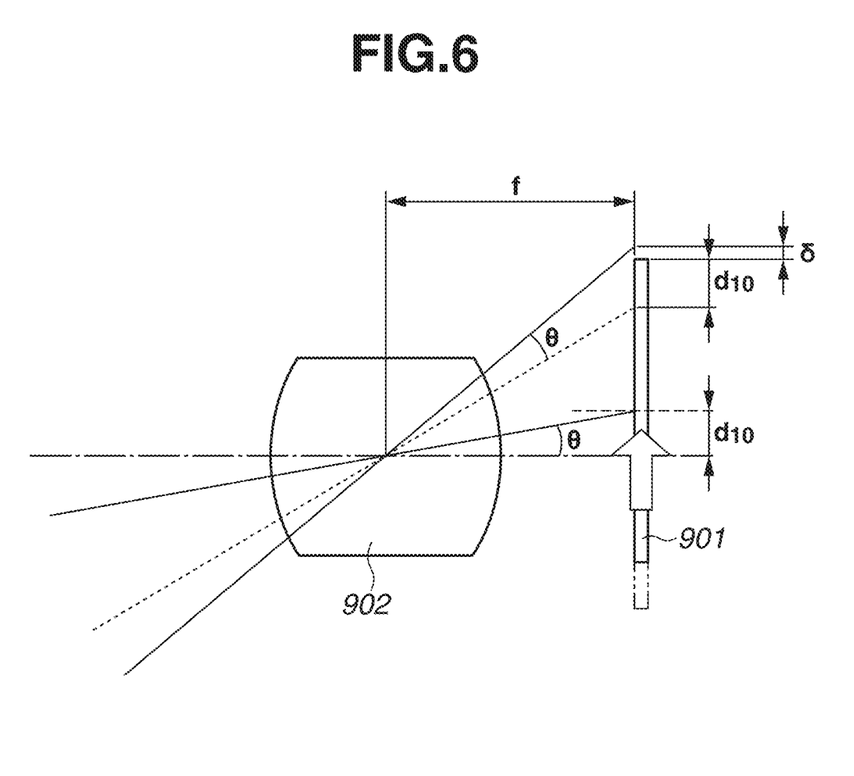
FIG. 6 is a schematic diagram illustrating a difference of an image blur amount depending on an image height.

FIG. 6 schematically illustrates a state where the camera-side image blur correction unit moves an image sensor 901 from a position indicated by a dotted line to an upper side of the paper by a distance $d_{10}$. Referring to FIG. 6, the camera-side image blur correction unit moves the image sensor 901 by the distance $d_{10}$ in response to rotation of the entire camera system by an angle θ due to a camera shake. However, it can be seen in FIG. 6 that a moving amount of a subject image after the rotation by the angle θ differs between the central portion and the peripheral portion because of a short focal length f of an imaging optical system 902. More specifically, in a case where the entire camera system rotates by the angle θ, the moving amount of the subject image corresponds to the distance $d_{10}$ at the central portion of the image sensor 901, whereas the moving amount of the subject image corresponds to the distance $d_{10}+\delta$ at the peripheral portion of the image sensor 901. Thus, if the entire camera system rotates by the angle θ, moving the image sensor 901 by the distance $d_{10}$ eliminates the influence of the image blur (corresponding to the distance $d_{10}$) at the central portion, but does not completely eliminate the influence of the image blur (corresponding to the distance $d_{10}+\delta$) at the peripheral portion. The difference (6) in the moving amount of the subject image between the central portion and the peripheral portion depends on characteristics of the imaging optical system 902.

In the following exemplary embodiment, a description will be given of a control apparatus that controls at least one of a lens apparatus, an imaging apparatus, and a camera system to reduce the influence of the image blur remaining at the peripheral portion even in a case where there is a large difference in the moving amount of the subject image between the central portion and the peripheral portion.

Figure 1A:
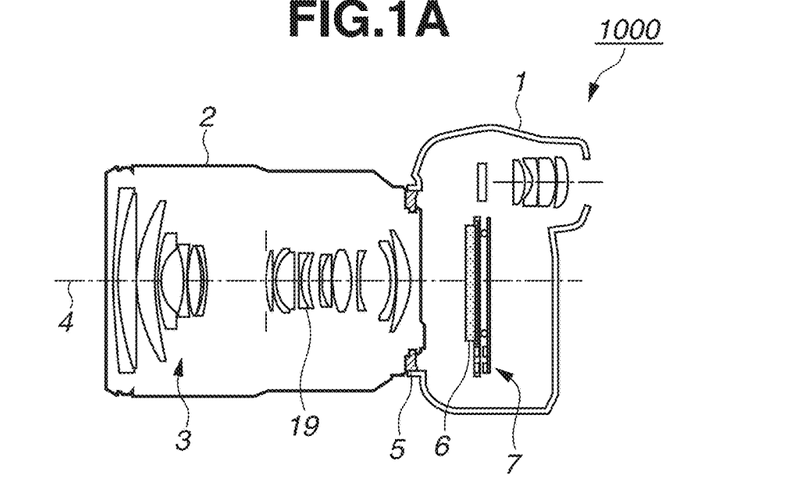
FIG. 1A is a cross-sectional view illustrating a configuration of a camera system.
Figure 1B:
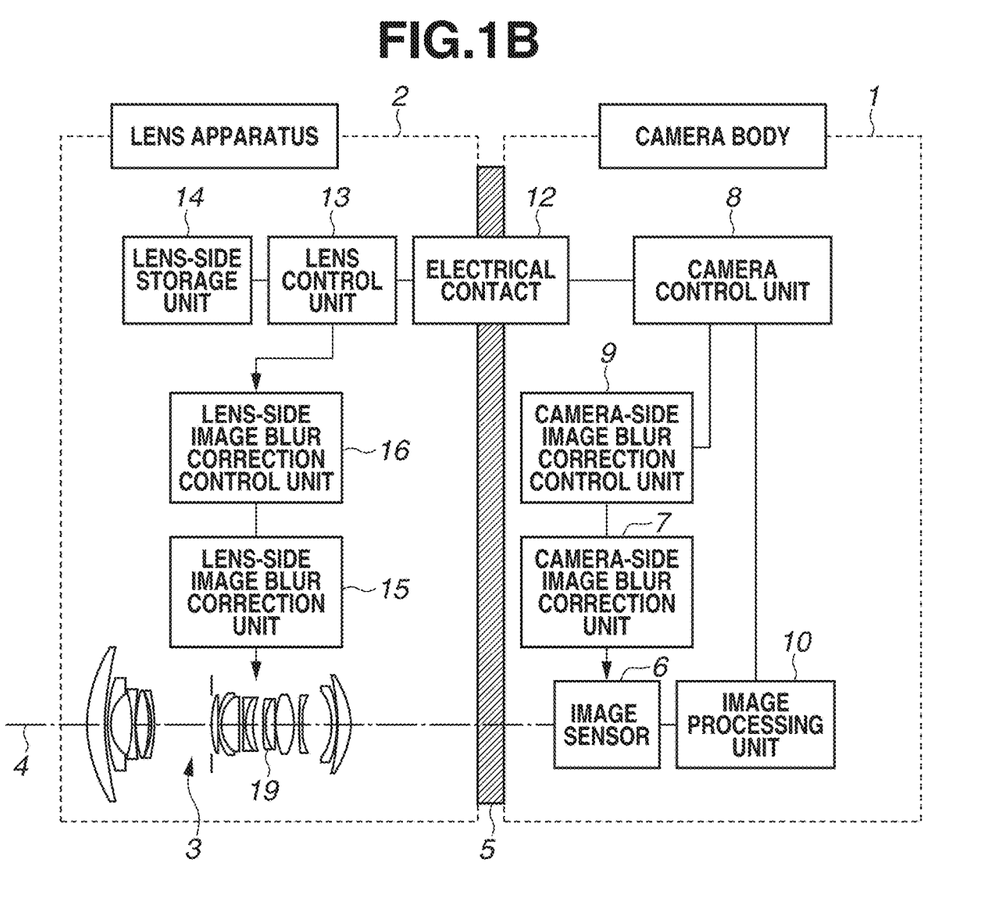
FIG. 1B is a block diagram illustrating the configuration of the camera system.

FIGS. 1A and 1B schematically illustrate a configuration of an imaging system 1000 according to the present exemplary embodiment. FIG. 1A is a cross-sectional view illustrating a central portion of the imaging system 1000. FIG. 1B is a block diagram illustrating an electrical configuration of the imaging system 1000.

As illustrated in FIGS. 1A and 1B, the imaging system 1000 according to the present exemplary embodiment includes a camera body 1, and a lens apparatus 2 attachable to the camera body 1. The lens apparatus 2 includes an imaging optical system 3 including an image blur correction optical system 19 and a plurality of lenses. A dotted line indicates an optical axis 4 of the imaging optical system 3. The camera body 1 includes an image sensor 6, and a camera-side image blur correction unit 7 that corrects an image blur by moving the image sensor 6 in a plane perpendicular to the optical axis 4. The imaging system 1000 is an interchangeable single lens camera and is configured to detachably attach various types of interchangeable lenses to the camera body 1 via a ring-shaped mounting block 5. When the lens apparatus 2 is attached to the camera body 1 via the mounting block 5 having an electrical contact 12, the lens apparatus 2 and the camera body 1 are communicably connected with each other.

While in the present exemplary embodiment, an interchangeable single lens camera is described as an example, the present exemplary embodiment is not limited thereto. The present exemplary embodiment is also applicable to non-lens-interchangeable systems.

FIG. 1B is a block diagram illustrating a schematic configuration of the imaging system 1000. In the imaging system 1000, light from a shooting field angle centering on the optical axis 4 of the imaging optical system 3 of the lens apparatus 2 passes through the imaging optical system 3 and is focused as a subject image on the image sensor 6 disposed in the camera body 1. The subject image is photoelectrically converted into an electrical signal by a photoelectric conversion unit (not illustrated) of the image sensor 6, and the electrical signal is transmitted to an image processing unit 10. In the image processing unit 10, the image signal is subjected to processing such as development processing and gamma processing and then converted into an image file format. The image file is stored in a nonvolatile memory (not illustrated) by a camera control unit 8.

The image sensor 6 disposed in the camera body 1 is configured to move in the plane perpendicular to the optical axis 4 by the camera-side image blur correction unit 7. The camera-side image blur correction unit 7, including an actuator and a support member that supports the image sensor 6, drives the actuator to move the image sensor 6 in the plane perpendicular to the optical axis 4. A camera-side image blur correction control unit 9 controls the camera-side image blur correction unit 7 under control of the camera control unit 8 to perform camera-side image blur correction. The image blur correction optical system 19, which is a part of the imaging optical system 3 of the lens apparatus 2, is configured to move in the plane perpendicular to the optical axis 4 by a lens-side image blur correction control unit 16 and a lens-side image blur correction unit 15. The lens-side image blur correction unit 15, including an actuator and a support member that supports the image blur correction optical system 19, drives the actuator to move the image blur correction optical system 19 in the plane perpendicular to the optical axis 4. The lens-side image blur correction control unit 16 controls the lens-side image blur correction unit 15 under control of a lens control unit 13 to perform lens-side image blur correction.

The camera control unit 8 and the lens control unit 13 cooperate with each other through communication via the electrical contact 12 to drive and control the camera-side image blur correction unit 7 and the lens-side image blur correction unit 15, respectively, thereby reducing unnecessary vibrations applied to the imaging system 1000. In the present exemplary embodiment, an example will be described in which the camera control unit 8 transmits an instruction to the lens control unit 13 to control the lens-side image blur correction control unit 16 and the lens-side image blur correction unit 15 via the lens control unit 13, thereby controlling the image blur correction for the entire imaging system 1000.

A lens-side storage unit 14 stores current focal length information f and distortion information d about the lens apparatus 2, and an image blur correction angle (corresponding to a movable range of the image blur correction optical system 19) controllable by the lens-side image blur correction unit 15. The focal length information f, the distortion information d, and the image blur correction angle of the lens-side image blur correction unit 15 are referred to by the lens control unit 13, or by the camera control unit 8 disposed in the camera body 1 via the electrical contact 12. The camera control unit 8 issues an instruction related to the drive control of the camera-side image blur correction unit 7 to the camera-side image blur correction control unit 9, based on the focal length information f, the distortion information d, and the image blur correction angle controllable by the lens-side image blur correction unit 15. For example, the camera control unit 8 calculates, based on the focal length information f, the image blur correction angle controllable by the camera-side image blur correction unit 7 and then determines a ratio of drive amount (a drive ratio) between the two image blur correction units (the camera-side image blur correction unit 7 and the lens-side image blur correction unit 15), together with the lens control unit 13.

For example, the camera control unit 8 also changes the method for determining the drive ratio between the two image blur correction units (the camera-side image blur correction unit 7 and the lens-side image blur correction unit 15), based on the distortion information d. A method for controlling the image blur correction units (the camera-side image blur correction unit 7 and the lens-side image blur correction unit 15) based on the distortion information d will be described in detail below.

The lens control unit 13 drives and controls various components via various control units (not illustrated) according to instructions given from the camera body 1. For example, based on focal point detection information and photometry information about a subject obtained by the image processing unit 10, the lens control unit 13 drives and controls a focus adjustment unit and a diaphragm unit (which are not illustrated) via a focus adjustment control unit and a diaphragm control unit (which are not illustrated), respectively, thereby enabling adjustment of a subject image forming state and a diaphragm state.

Figure 2:
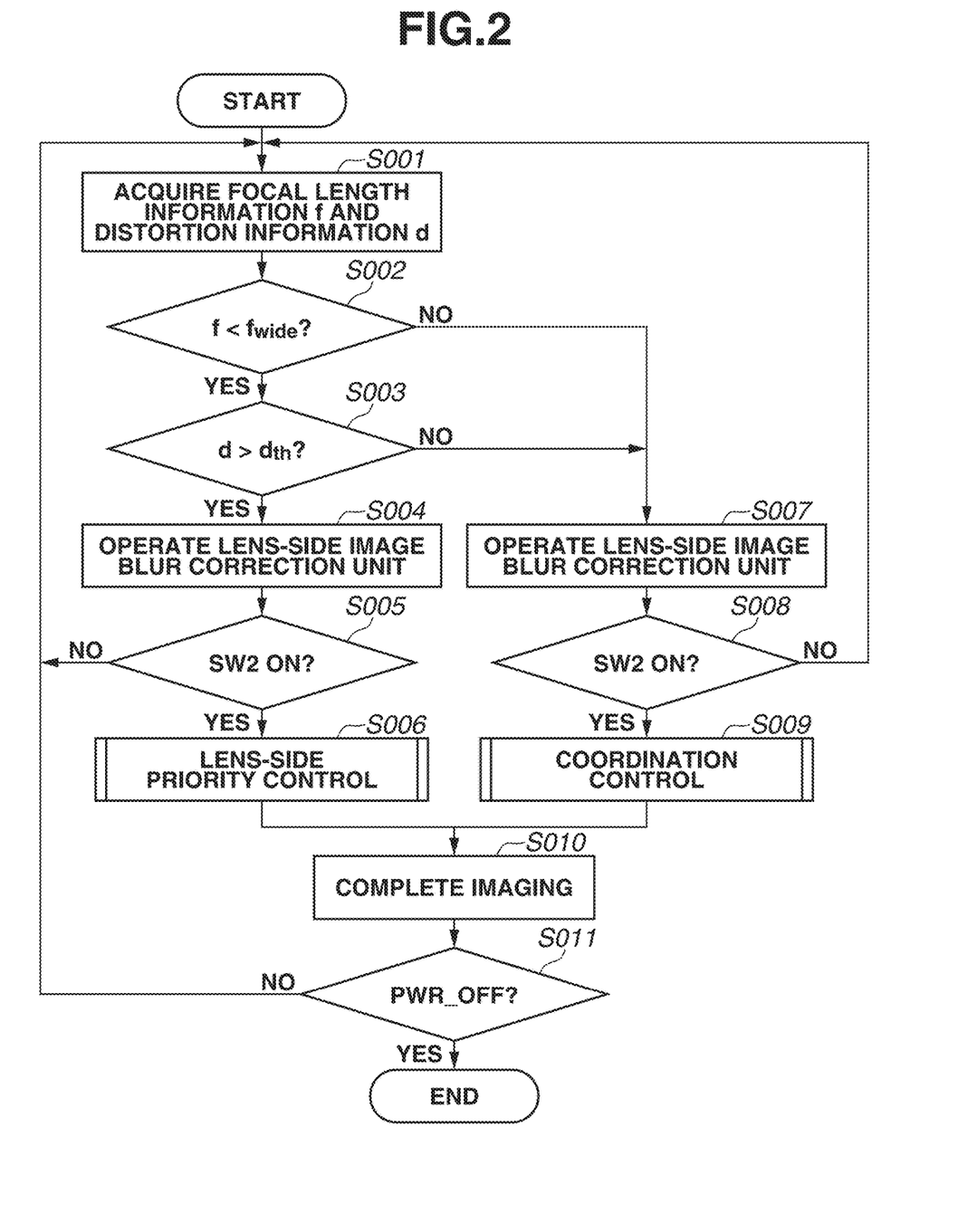
FIG. 2 is a flowchart illustrating an image blur correction operation performed by the camera system under control of a camera body.
Figure 3:
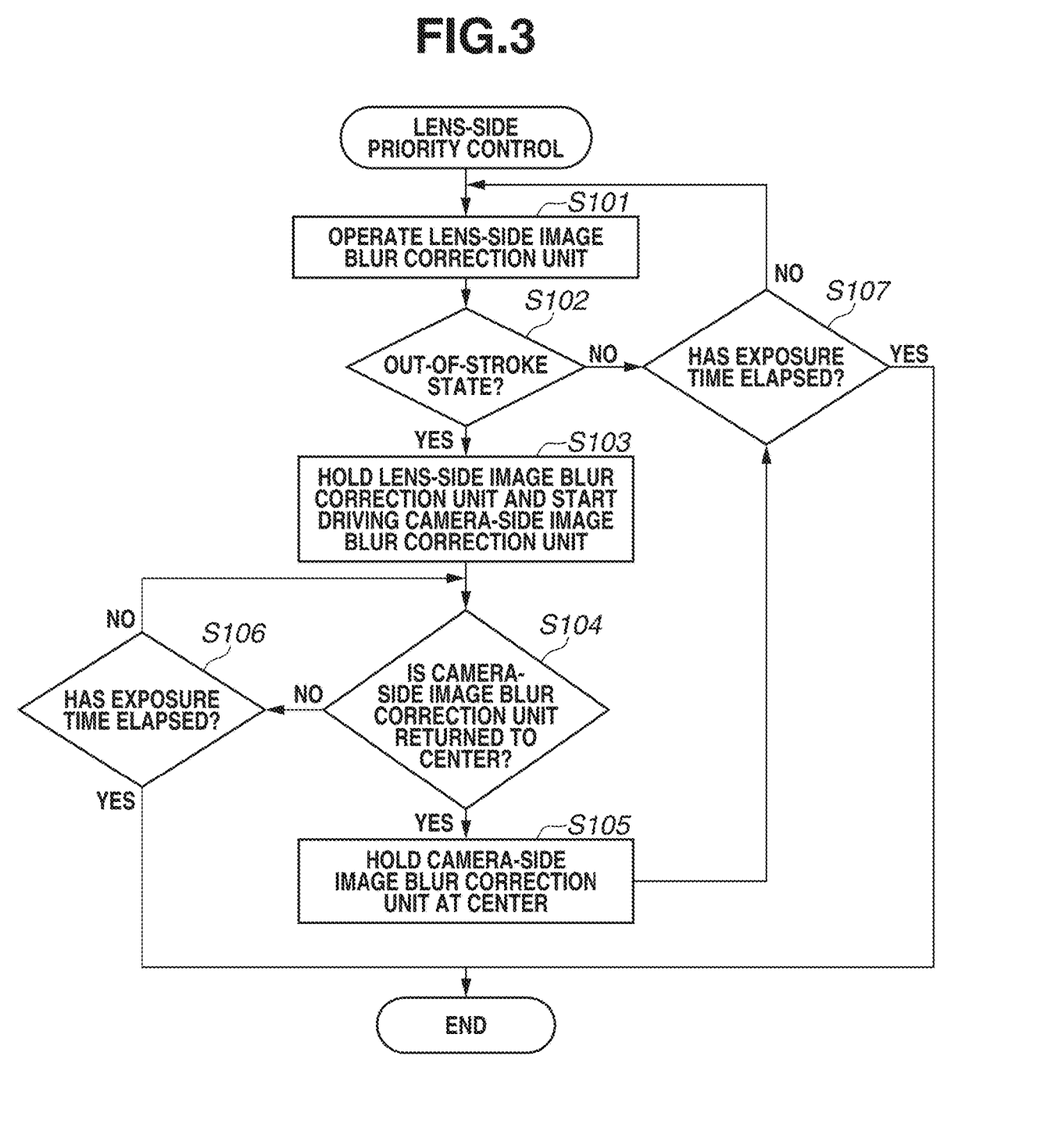
FIG. 3 is a flowchart illustrating lens-side priority drive control performed by the camera system under control of the camera body.
Figure 4:
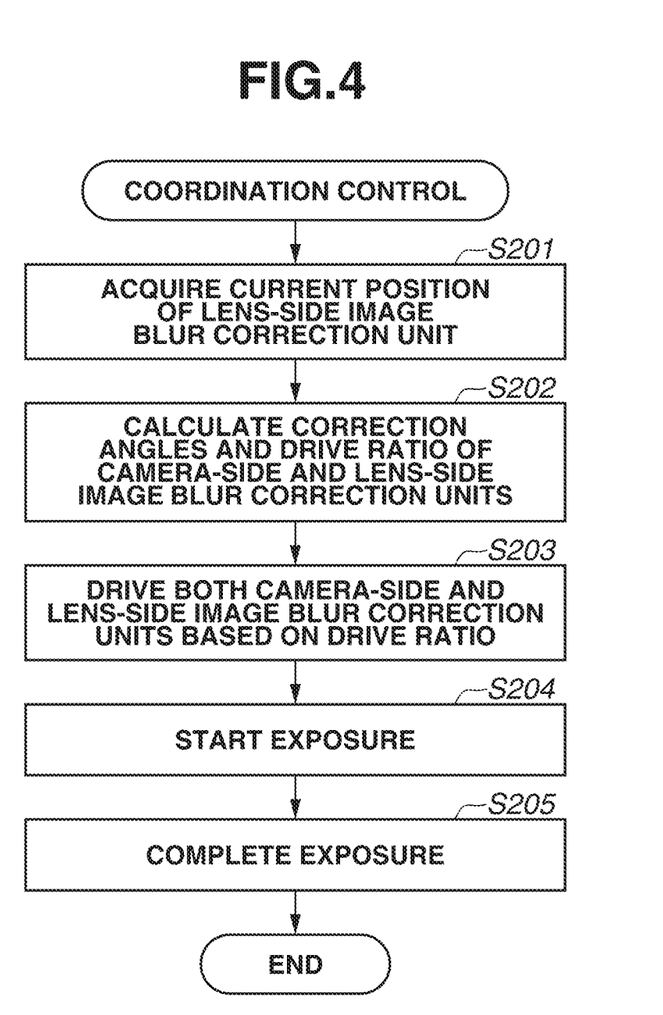
FIG. 4 is a flowchart illustrating coordination control performed by the camera system under control of camera body.

FIGS. 2 to 4 are flowcharts illustrating an image blur correction operation performed by the imaging system 1000. As described above, in the image blur correction operation by the imaging system 1000, the camera control unit 8 determines the control amounts of the two image blur correction control units (the camera-side image blur correction unit 7 and the lens-side image blur correction unit 15) based on the information stored in the lens-side storage unit 14 while communicating with the lens control unit 13 via the electrical contact 12. The flowcharts include the flowchart of the entire image blur correction operation, including two subroutines, illustrated in FIG. 2, the flowchart of one of the subroutines named "lens-side priority control" (a first drive mode) illustrated in FIG. 3, and the flowchart of the other subroutine named "coordination control" (a second drive mode) illustrated in FIG. 4.

The flowchart of the entire image blur correction operation illustrated in FIG. 2 is started when the imaging system 1000 is powered on or when the imaging system 1000 returns from a sleep mode. In step S001, the camera control unit 8 acquires the focal length information f and the distortion information d that are stored in the lens-side storage unit 14, via the electrical contact 12 and the lens control unit 13. As described above, the focal length information f is the current focal length information about the imaging optical system 3. In a case where the lens apparatus 2 is a zoom lens, the focal length information f is fluctuated by a zoom ring operation and thus is updated through occasional communication. The distortion information d indicates a projection condition of the imaging optical system 3. In the present exemplary embodiment, the distortion information d is called in this way since the information comes down an image distortion. The distortion information d may be flag information indicating that, between the central portion (around the position at an image height of 0) and the peripheral portion (the region with a large image height), a difference in relative moving amount of the image sensor 6 and a projected image accompanying the movement of the camera-side image blur correction unit 7 is equal to or larger than (or smaller than) a predetermined value. Alternatively, the distortion information d may have a form of a function that indicates how the relative moving amount of the image sensor 6 and the projected image accompanying the movement of the camera-side image blur correction unit 7 changes between the central portion and the peripheral portion.

In step S002, the camera control unit 8 determines whether the focal length information f acquired in step S001 is smaller than a predetermined focal length $f_{wide}$, i.e., whether the lens apparatus 2 is a wider angle lens. In a case where the camera control unit 8 determines that the lens apparatus 2 is a wider angle lens (YES in step S002), the processing proceeds to step S003. On the other hand, in a case where the camera control unit 8 determines that the lens apparatus 2 is not a wider angle lens (NO in step S002), the processing proceeds to step S007. In one embodiment, the predetermined focal length $f_{wide}$ is a value that enables determining whether the lens apparatus 2 is a super wide angle lens in this step.

In step S003, the camera control unit 8 determines whether the imaging optical system 3 satisfies a predetermined distortion condition, based on the distortion information d acquired in step S001. In this flowchart, the predetermined distortion condition is defined as a ratio $d_{th}$ ($d_r/d_0$) between the relative moving amount $d_0$ of the projected image and the image sensor 6 at the central portion and the relative moving amount $d_r$ of the projected image and the image sensor 6 at the peripheral portion, which accompany the movement of the image sensor 6 by a predetermined moving amount. In a case where the distortion information d acquired in step S001 is larger than the ratio (the threshold value) $d_{th}$, the camera control unit 8 determines that the distortion information d is true. In a case where the distortion information d is determined to be true (YES in step S003), the processing proceeds to step S004. On the other hand, in a case where the distortion information d is determined to be false (NO in step S003), the processing proceeds to step S007. In other words, in a case where a value corresponding to the difference δ in FIG. 6 exceeds a threshold value, the processing proceeds to step S004. On the other hand, in a case where the value is equal to or smaller than the threshold value, the processing proceeds to step S007.

In step S004, the lens-side image blur correction control unit 16 starts driving and controlling the lens-side image blur correction unit 15 under control of the lens control unit 13 that is notified by the camera control unit 8 that the processing proceeds to this step. In a case where the drive control has already been started, the lens-side image blur correction control unit 16 continues the drive control. Similarly to step S004, in step S007, the lens-side image blur correction control unit 16 starts driving and controlling the lens-side image blur correction unit 15. In a case where the drive control has already been started, the lens-side image blur correction control unit 16 continues the drive control. In steps S004 and S007, for example, a drive control stroke (an upper limit value of the correction amount) in step S004 may be made smaller than that in step S007 for the driving in the current and subsequent processing.

After steps S004 and S007, the processing proceeds to steps S005 and S008, respectively. In steps S005 and S008, the camera control unit 8 determines whether an imaging start instruction (which is referred to as SW 2) is input. More specifically, the camera control unit 8 determines whether a release button provided on the imaging system 1000 is pressed by an imaging person. In a case where the camera control unit 8 determines that the release button is pressed (YES in step S005), the processing proceeds to step S006. In a case where the camera control unit 8 determines that the release button is pressed (YES in step S008), the processing proceeds to step S009. In a case where the press of the release button is not detected (NO in step S005 or S008), the processing returns to step S001. In step S001, the camera control unit 8 acquires the focal length information f and the distortion information d again. This is intended to cope with the fluctuations of the focal length information f and the distortion information d during an operation by the imaging person to change the focal length by using a zoom lens and an operation by the imaging person to change the focusing state. In steps S005 and S008, the camera control unit 8 may determine whether an imaging start instruction other than the press of the release button by the imaging person is input. For example, the camera control unit 8 may determine whether an imaging start instruction is input from a remote control terminal wirelessly connected to the camera body 1. In a case where the configuration is such that an imaging start instruction is input upon automatic detection of an imaging condition by the camera body 1 based on image information acquired by the image sensor 6, the camera control unit 8 may determine whether the imaging start instruction is input.

In step S006, the camera control unit 8 transmits an instruction for starting the lens-side priority control (described below) to the lens control unit 13 and starts the lens-side priority control (described below). The lens-side priority control is continuously performed until an exposure time is completed. In step S009, the camera control unit 8 transmits an instruction for starting the coordination control (described below) to the lens control unit 13 and starts the coordination control (described below). The coordination control is also performed continuously until the exposure time is completed. In other words, in this flowchart, the camera control unit 8 selects a drive mode for image blur correction between the lens-side priority control and the coordination control, based on the focal length information f and the distortion information d, and then performs the image blur correction based on the selected mode. The camera control unit 8 may issue an instruction for selecting the drive mode for image blue correction between the lens-side priority control and the coordination control, to the lens control unit 13 at any timing. For example, immediately after the camera control unit 8 determines which drive mode is to be set in step S002 and S003, the camera control unit 8 may transmit instruction information based on the selection result. In the present exemplary embodiment, the lens-side image blur correction control unit 16 and the lens-side image blur correction unit 15 perform the lens-side priority control or the coordination control based on the determination result by the camera control unit 8. In the present exemplary embodiment, even in a case where the camera control unit 8 indirectly controls the lens-side image blur correction control unit 16 and the lens-side image blur correction unit 15 via the lens control unit 13, the camera control unit 8 is described to control the lens-side image blur correction control unit 16 and the lens-side image blur correction unit 15.

When the exposure time is completed in step S006 or S009, the processing proceeds to step S010. In step S010, the imaging is completed. Then, the processing proceeds to step S011. In step S011, the camera control unit 8 determines whether a main switch of the imaging system 1000 is turned off. In a case where the camera control unit 8 determines that the main switch is not turned off (NO in step S011), the processing returns to step S001. In step S001, the camera control unit 8 prepares for the next imaging. On the other hand, in a case where the camera control unit 8 determines that the main switch is turned off (YES in step S011), the camera control unit 8 terminates the flowchart to perform camera termination processing. The camera control unit 8 may terminate the flowchart after determining that a reproduction mode for reproducing an image captured by the camera body 1 on a display unit (not illustrated) is selected, instead of determining that the main switch is turned off.

FIG. 3 is the subroutine flowchart illustrating the lens-side priority control performed in step S006 in FIG. 2. As described above, the relative moving amount of the subject image and the image sensor 6 accompanying the movement of the image sensor 6 by a predetermined amount is different between the central portion with a small image height and the peripheral portion with a large image height. Accordingly, under a condition where there is a large difference in the relative moving amount between the central portion and the peripheral portion, the lens-side image blur correction performed by moving the image blur correction optical system 19 reduces the remaining blur at the peripheral portion more than the camera-side image blur correction performed by moving the image sensor 6. Thus, in the subroutine in FIG. 3, the image blur correction using the lens-side image blur correction unit 15 is used in preference to the image blur correction using the camera-side image blur correction unit 7, so that the remaining blur at the peripheral portion is reduced even under the condition where there is a large difference in the relative moving amount between the central portion and the peripheral portion. In other words, reaching this subroutine means that the image blur correction using the lens-side image blur correction unit 15 on a priority basis is determined to better satisfy the condition for reducing the influence of blur.

More specifically, in the subroutine in FIG. 3, in a case where the amount of shake applied to the imaging system 1000 is the amount that can be corrected without using the camera-side image blur correction unit 7, the image blur correction is performed by using the lens-side image blur correction unit 15 without using the camera-side image blur correction unit 7. On the other hand, in a case where the amount of shake applied to the imaging system 1000 is large and the correction angle is insufficient without using the camera-side image blur correction unit 7, the image blur correction is performed by using the lens-side image blur correction unit 15 and, at the same time, the image blur correction for the insufficient correction angle is performed by using the camera-side image blur correction unit 7. Upon start of the subroutine, the image sensor 6 has started exposure for capturing a recording image, in response to the detection of SW 2 in step S005 in FIG. 2. Each step of the subroutine will be described with reference to FIG. 3.

The subroutine in FIG. 3 is executed by the camera-side image blur correction control unit 9 and the lens-side image blur correction control unit 16 under control of the camera control unit 8 and the lens control unit 13, respectively. When the lens control unit 13 receives an instruction for starting the lens-side priority control, the lens control unit 13 sets the drive mode for image blur correction so that the lens-side image blur correction unit 15 performs the image blur correction based on the lens-side priority control. Then, the subroutine in FIG. 3 is started.

In step S101, the lens-side image blur correction control unit 16 drives and controls the lens-side image blur correction unit 15. The lens-side image blur correction control unit 16 calculates the correction amount based on the amount of shake applied to the imaging system 1000 and then drives and controls the lens-side image blur correction unit 15 to move the image blur correction optical system 19 based on the calculated correction amount. The shake amount may be acquired based on an output of a sensor that physically measures the moving amount, such as an angular velocity sensor, based on an image, or based on both. A known technique can be used as the method for calculating the correction amount, and a redundant description thereof will be omitted. For example, the shake angle is obtained by integrating the output of the angular velocity sensor with noise cut by using a filter, and then eliminating the sensitivity (the variation of the image blur correction optical system 19 in the optical axis direction per unit moving amount).

In step S102, the lens-side image blur correction control unit 16 determines whether the lens-side image blur correction unit 15 drives the image blur correction optical system 19 beyond the control range (the movable range), i.e., whether an out-of-stroke state is reached. In a case where the out-of-stroke state is determined to be reached (YES in step S102), the processing proceeds to step S103. On the other hand, in a case where the out-of-stroke state is determined to be not reached (NO in step S102), the processing proceeds to step S107.

In step S103, the lens-side image blur correction control unit 16 stops the lens-side image blur correction unit 15 to hold the position where the out-of-stroke state is entered. Approximately at the same time, the camera-side image blur correction control unit 9 starts driving the camera-side image blur correction unit 7 that has been deactivated at a reference position (which is referred to as a center). The transfer of the drive control described above is performed by using the camera-side image blur correction control unit 9 and the lens-side image blur correction control unit 16 through communication between the camera control unit 8 and the lens control unit 13 via the electrical contact 12. More specifically, the camera control unit 8 is notified, via the lens control unit 13 and the electrical contact 12, that the position of the image blur correction optical system 19 has reached the end of the control range, based on a position signal of the lens-side image blur correction unit 15 and a control state of the lens-side image blur correction control unit 16. Upon reception of the notification, the camera control unit 8 issues an instruction for starting the driving of the camera-side image blur correction unit 7 to the camera-side image blur correction control unit 9. The reference position refers to the position of the camera-side image blur correction unit 7 in a state where the camera shake correction function is deactivated or the shake amount is zero. Generally, the reference position refers to the position where the optical axis 4 is incident on the vicinity of the center of a range (an imaging region) to be used in imaging in the light-receiving surface of the image sensor 6. Then, the processing proceeds to step S104.

In step S104, the camera-side image blur correction control unit 9 determines whether the position of the camera-side image blur correction unit 7 in a driven state has returned to the center. In a case where the position is determined to have returned to the center (YES in step S104), the processing proceeds to step S105. On the other hand, in a case where the position is determined to have not returned to the center (NO in step S104), the processing proceeds to step S106. In step S106, the camera-side image blur correction control unit 9 determines whether a predetermined exposure time has elapsed since the start of the exposure in response to the detection of SW 2. In a case where the predetermined exposure time is determined to have not elapsed (NO in step S106), the processing returns to step S104. On the other hand, in a case where the predetermined exposure time is determined to have elapsed (YES in step S106), the processing exits the subroutine.

In step S105, the camera-side image blur correction control unit 9 performs positioning control to hold the camera-side image blur correction unit 7 at the center position again at the timing when the camera-side image blur correction unit 7 has returned to the center. Then, the processing proceeds to step S107. In step S107, the camera-side image blur correction control unit 9 determines whether the predetermined exposure time has elapsed, similarly to step S106. In a case where the predetermined exposure time is determined to have not elapsed (NO in step S107), the processing returns to step S101. On the other hand, in a case where the predetermined exposure time is determined to have elapsed (YES in step S107), the processing exits the subroutine, similarly to step S106. According to the subroutine flowchart in FIG. 3, the image blur correction is performed by the lens-side image blur correction unit 15 until the lens-side image blur correction unit 15 runs out of stroke. At the time when the lens-side image blur correction unit 15 runs out of stroke, the image blur correction is performed in such a manner that the camera-side image blur correction unit 7 takes over the correction of the image blur that cannot be corrected by the lens-side image blur correction unit 15. The lens-side priority control is not limited thereto. For example, the camera-side image blur correction unit 7 may be driven before the lens-side image blur correction unit 15 runs out of stroke so that the taking over is smoothly performed.

More specifically, in the lens-side priority control, in a case where the shake amount of the imaging system 1000 is equal to or smaller than a threshold value, the lens-side image blur correction unit 15 is driven and controlled (moved) based on the shake amount. On the other hand, in a case where the shake amount of the imaging system 1000 exceeds the threshold value, the lens-side image blur correction unit 15 and the camera-side image blur correction unit 7 are driven and controlled based on the shake amount. In a case where the shake amount exceeds the threshold value, the lens-side image blur correction unit 15 is driven and controlled based on the shake amount corresponding to the threshold value, and the camera-side image blur correction unit 7 is driven and controlled based on the shake amount corresponding to the difference between the shake amount of the imaging system 1000 and the threshold value. For example, the camera control unit 8 controls the camera-side image blur correction unit 7 via the camera-side image blur correction control unit 9 so that the camera-side image blur correction unit 7 is moved based on a difference between a first correction amount acquired based on the shake amount and the correction amount (the stroke in FIG. 3) corresponding to the threshold value. This enables restricting the moving amount of the image blur correction optical system 19 to the image blur correction amount corresponding to the threshold value or less (i.e., the stroke or less).

FIG. 4 is the subroutine flowchart illustrating the coordination control performed in step S009 in FIG. 2. In the subroutine, the image blur correction is performed by using the lens-side image blur correction unit 15 and the camera-side image blur correction unit 7 even if the shake amount of the imaging system 1000 can be corrected enough by the image blur correction using the lens-side image blur correction unit 15. In the above-described lens-side priority control, after the lens-side image blur correction unit 15 is determined to run out of stroke, the lens apparatus 2 notifies the camera body 1 of the out-of-stroke state through communication, and then the driving of the camera-side image blur correction unit 7 is started. This can cause a delay in driving the camera-side image blur correction unit 7. In addition, the camera body 1 and the lens apparatus 2 are to communicate with each other during the exposure period. Generally, the communication between the camera body 1 and the lens apparatus 2 takes longer than communication between blocks in each of the camera body 1 and the lens apparatus 2. Thus, accuracy of the image blur correction may degrade due to the influence of the communication delay. To address the issue, in the subroutine in FIG. 4, a drive ratio is determined as a blur correction sharing ratio between the lens-side image blur correction unit 15 and the camera-side image blur correction unit 7, and the image blur correction is performed by each of the lens-side image blur correction unit 15 and the camera-side image blur correction unit 7 based on the drive ratio, so that the influence of the communication delay is reduced more than in the subroutine in FIG. 3. In other words, reaching this subroutine means that the influence of the remaining blur at the peripheral portion due to the difference in the relative moving amount between the central portion and the peripheral portion is determined to be small even if the shake correction is performed by using both the lens-side image blur correction unit 15 and the camera-side image blur correction unit 7.

Each step of the subroutine will be described with reference to FIG. 4.

The subroutine in FIG. 4 is executed by the camera-side image blur correction control unit 9 and the lens-side image blur correction control unit 16 under control of the camera control unit 8 and the lens control unit 13, respectively. When the lens control unit 13 receives an instruction for starting the coordination control, the lens control unit 13 sets the drive mode for image blur correction so that the lens-side image blur correction unit 15 performs the image blur correction based on the coordination control. Then, the subroutine in FIG. 4 is started.

In step S201, the lens-side image blur correction control unit 16 acquires the current position of the lens-side image blur correction unit 15 immediately before the detection of SW 2. Then, the processing proceeds to step S202. In step S202, considering the remaining stroke amount calculated from the current position of the lens-side image blur correction unit 15 acquired in step S201, the camera control unit 8 calculates the current correction angles of the camera-side image blur correction unit 7 and the lens-side image blur correction unit 15. The total correction angle of the lens-side image blur correction unit 15 and the camera-side image blur correction unit 7 can be acquired at the time when the lens apparatus 2 is attached or at the time when the zoom position is fixed. In this step, the total correction angle is recalculated based on the stroke that can be used by the lens-side image blur correction unit 15 at the time when SW 2 has been detected. In step S202, the camera control unit 8 determines the drive ratio as the ratio between the camera-side correction angle and the lens-side correction angle that can be implemented with the stroke amounts of the lens-side image blur correction unit 15 and the camera-side image blur correction unit 7. As described above, the drive ratio is the blur correction sharing ratio.

In step S203, the imaging system 1000 starts the image blur correction control based on the drive ratio determined in step S202. For example, in a case where the imaging system 1000 rotates by the angle θ with the drive ratio of 4:6 between the lens-side image blur correction unit 15 and the camera-side image blur correction unit 7, the drive ratio of 0.4 is set to the lens-side image blur correction control unit 16 so that the image blur corresponding to the angle θ*0.4 is corrected by the lens-side image blur correction unit 15. Likewise, the drive ratio of 0.6 is set to the camera-side image blur correction control unit 9 so that the image blur corresponding to the angle θ*0.6 is corrected by the camera-side image blur correction unit 7. A known method is applicable as a method for driving and controlling the lens-side image blur correction control unit 16 and the camera-side image blur correction control unit 9 based on a predetermined drive ratio, and the detailed description thereof will be omitted. For example, the lens-side image blur correction control unit 16 may acquire the shake amount of the imaging system 1000, acquire the lens-side image blur correction amount and the camera-side image blur correction amount based on the shake amount and the drive ratio, and then transmit the camera-side image blur correction amount to the camera body 1 to drive and control the camera-side image blur correction control unit 9. In a case where each of the lens apparatus 2 and the camera body 1 can acquire the shake amount, the lens-side image blur correction control unit 16 and the camera-side image blur correction control unit 9 may acquire the respective correction amounts based on the drive ratio determined in step S202 and the respective acquired shake amounts. With this method, since the camera body 1 and the lens apparatus 2 acquire the respective correction amounts, the camera body 1 and the lens apparatus 2 can perform the respective image blur corrections once the drive ratio has been transmitted to the lens apparatus 2. This method is less likely to be affected by the communication delay and can reduce the communication traffic volume. The drive control started in this step is continued until the exposure is completed.

Figure 5A:
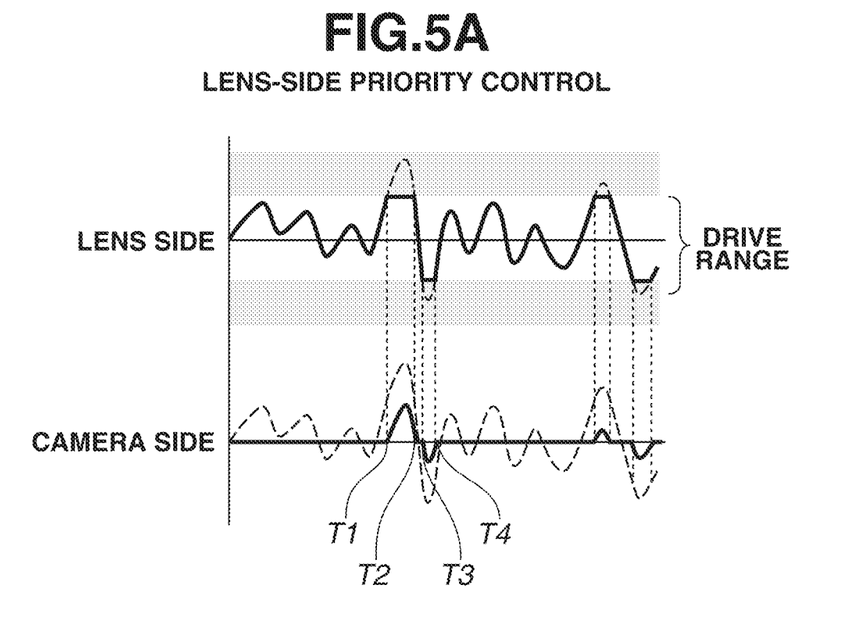
FIG. 5A is a schematic diagram illustrating the lens-side priority control performed by the camera system under control of the camera body.
Figure 5B:
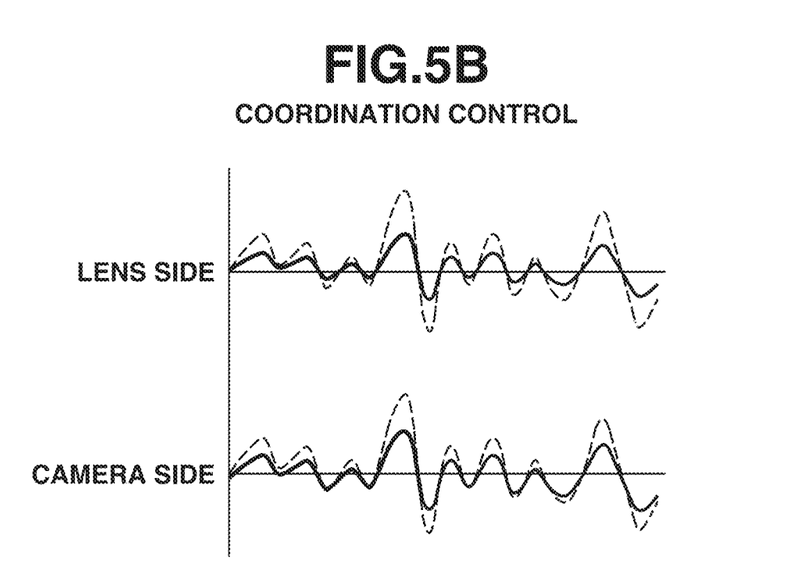
FIG. 5B is a schematic diagram illustrating the coordination control performed by the camera system under control of the camera body.

Subsequently, the exposure is started in step S204 and completed in step S205. Then, the processing exits the subroutine. The coordination control by this subroutine makes the utmost use of the strokes of the lens-side image blur correction unit 15 and the camera-side image blur correction unit 7. In this case, the image blur correction can be performed without causing a large difference in the remaining image blur correction between the image heights at the central portion and the peripheral portion because of the optical characteristics of the lens apparatus 2. FIGS. 5A and 5B are schematic diagrams illustrating the driving states of the camera-side image blur correction unit 7 and the lens-side image blur correction unit 15 in the lens-side priority control and the coordination control illustrated in FIGS. 3 and 4, respectively. In FIGS. 3 and 4, the driving of the camera-side image blur correction unit 7 and the lens-side image blur correction unit 15 refers to the driving of the camera-side image blur correction unit 7 and the lens-side image blur correction unit 15 for moving the image sensor 6 and the image blur correction optical system 19, respectively. The driving does not include the drive control for holding the camera-side image blur correction unit 7 and the lens-side image blur correction unit 15 at respective predetermined positions. Referring to graphs in FIGS. 5A and 5B, the horizontal axis represents time T and the vertical axis represents the correction amounts of the lens-side image blur correction unit 15 and the camera-side image blur correction unit 7 with angles. The exposure start time is at the left end of each of the graphs, and the exposure is continuously performed in the time axis of each of the graphs. FIG. 5A illustrates the driving states in the lens-side priority control, and FIG. 5B illustrate the driving states in the coordination control. As illustrated in FIG. 5A, in the lens-side priority control, the lens-side image blur correction unit 15 is driven in the initial control stage at the left end of the graph (i.e., immediately after the start of the exposure) (which corresponds to step S101 in FIG. 3). At time T1, the state (i.e., the out-of-stroke state) where the lens-side image blur correction unit 15 has reached the control end of the drive range is detected (which corresponds to step S102 in FIG. 3). From time T1, the lens-side image blur correction unit 15 stops at the control end, and the driving of the camera-side image blur correction unit 7 starts (which corresponds to step S103 in FIG. 3). When the camera-side image blur correction unit 7 returns to the center at time T2, the camera-side image blur correction unit 7 is held at the center position (which corresponds to steps S104 and S105 in FIG. 3). At time T2, the lens-side image blur correction unit 15 is driven again (which corresponds to the second execution of step S101 in FIG. 3). The lens-side image blur correction unit 15 continues to be driven until reaching the control end at time T3. In a period from time T3 to T4, the lens-side image blur correction unit 15 stops at the control end and the driving of the camera-side image blur correction unit 7 is controlled, similarly to the period from time T1 to T2. As described above, in the lens-side priority control, the lens-side image blur correction unit 15 and the camera-side image blur correction unit 7 are alternately driven. Using the lens-side image blur correction unit 15 on a priority basis makes it possible to reduce the difference in the remaining correction between the central portion and the peripheral portion, resulting in the reduced blur amount over the entire image.

Referring to FIG. 5B, the coordination control is performed based on the drive ratio determined in step S202 in FIG. 4. More specifically, during the exposure period illustrated in the graph, the lens-side image blur correction unit 15 and the camera-side image blur correction unit 7 are driven and controlled based on the predetermined ratio and with similar waveforms. The image blur correction operation suitable for the imaging optical system 3 of the lens apparatus 2 can be implemented by switching between the lens-side priority control and the coordination control, which are described with reference to FIGS. 2 to 5B, based on the focal length information f and the distortion information d.

In the "coordination control" of the imaging system 1000 described above, the camera control unit 8 determines, in step S202, the drive ratio between the lens-side image blur correction unit 15 and the camera-side image blur correction unit 7 for the subsequent processing, in consideration of the position of the lens-side image blur correction unit 15 immediately before the detection of SW 2. However, the exemplary embodiment of the disclosure is not limited thereto. For example, the drive ratio may be predetermined based on the focal length information f at the time when the lens apparatus 2 is attached, and then updated if the focal length information f is changed. However, in a case where the remaining correction angle of the lens-side image blur correction unit 15 is small (is close to the control end) at the time of starting the exposure and the drive ratio is not determined in consideration of the small remaining correction angle, the stroke of the lens-side image blur correction unit 15 may be insufficient during the exposure. Thus, the drive ratio is determined based on the position of the lens-side image blur correction unit 15 immediately before the detection of SW 2.

In the above-described exemplary embodiment, the "lens-side priority control" is performed if two different conditions are satisfied at the same time. One of the conditions is that the focal length information f is smaller than the predetermined focal length $f_{wide}$ (indicates a wide angle), and the other condition is that the distortion of the imaging optical system 3 is larger than the predetermined distortion condition $d_{th}$ based on the distortion information d. However, the exemplary embodiment of the disclosure is not limited thereto. A similar effect can be obtained by performing the "lens-side priority control" under one of the conditions. For example, in a general optical system, the predetermined focal length $f_{wide}$ may be set so that the difference δ (in FIG. 6) in the relative moving amount between the central portion and the peripheral portion is equal to or larger than a predetermined value, and the determination based on the distortion information d (in step S003 in FIG. 2) may be omitted.

While in the above-described exemplary embodiment, the lens-side storage unit 14 holds the focal length information f and the distortion information d, the above-described flag information may be held in the design stage in consideration of the focal length information f and the distortion information d. Alternatively, product identification (ID) information may be used as at least one of the focal length information f and the distortion information d. For example, when using the product ID information as the distortion information d, a camera-side storage unit may hold a table of the product ID and the distortion information d, and the camera control unit 8 may acquire the distortion information d based on the product ID acquired from the lens apparatus 2 and the table. In a case where the focal length of the lens apparatus 2 is unlikely to be shorter than the predetermined focal length $f_{wide}$, as long as the camera-side storage unit holds a table of the product ID and the focal length information f (the movable range in the case of a zoom lens), the camera control unit 8 can refer to the table to select the coordination control. Likewise, in case where the focal length of the lens apparatus 2 is unlikely to be equal to or larger than the predetermined focal length $f_{wide}$, the camera control unit 8 can select the lens-side priority control based on the product ID.

In the above-described exemplary embodiment, in response to the input of an imaging start instruction, the camera control unit 8 generates instruction information for starting the lens-side priority control or the coordination control and then transmits the information to the lens control unit 13. The camera control unit 8 may generate setting instruction information about the drive mode and transmit the information to the lens control unit 13 in a period from the determination of the drive mode to be used to the input of the imaging start instruction. In this case, the lens control unit 13 sets the drive mode upon reception of the setting instruction information, and starts the driving in the set drive mode upon reception of the imaging start instruction information from the camera control unit 8.

While in the above-described exemplary embodiment, the lens-side storage unit 14 is disposed inside the lens apparatus 2 for convenience, the above-described exemplary embodiment is not limited thereto. Even if the lens-side storage unit 14 exists in the camera body 1 or as an external storage unit capable of communicating with the imaging system 1000, the exemplary embodiment does not depart from the spirit and scope of the disclosure.

In the above-described exemplary embodiment, the camera-side image blur correction unit 7 and the lens-side image blur correction unit 15 move the image sensor 6 and the image blur correction optical system 19, respectively, in the plane perpendicular to the optical axis 4. The image sensor 6 and the image blur correction optical system 19 may also be moved in the optical axis direction as long as the positions in the perpendicular plane can be moved. More specifically, assuming that the optical axis direction is a z-axis direction, the image sensor 6 and the image blur correction optical system 19 may be moved in the optical axis direction as long as xy coordinates of each of the image sensor 6 and the image blur correction optical system 19 can be changed. In the above-described exemplary embodiment, the lens-side image blur correction unit 15 changes the position of the optical axis 4 incident on the light-receiving surface of the image sensor 6 by moving the position of the image blur correction optical system 19. Alternatively, the lens-side image blur correction may be performed by using other optical elements.

In the above-described exemplary embodiment, the example where the camera control unit 8 controls the image blur correction for the entire imaging system 1000 via the communication with the lens control unit 13 has been described. Alternatively, the lens control unit 13 may control the image blur correction for the entire imaging system 1000, or another apparatus connectable with at least one of the camera control unit 8 and the lens control unit 13 may control the image blur correction. In addition, another apparatus may perform part or whole of the processing performed by the camera control unit 8 and the lens control unit 13, to control the image blur correction for the entire imaging system 1000.

In the "lens-side priority control", the lens-side image blur correction unit 15 is driven and controlled on a priority basis in order to reduce the difference in the remaining blur amount between the central portion and the peripheral portions from the viewpoint of the image blur correction. Actually, in such an optical system, it is common that there is a large amount of distortion over the entire screen. In this case, after the above-described image blur correction, distortion correction may be performed as image processing before image recording. The image processing may be configured to record an image processing method and enable post-processing.

While the exemplary embodiments of the disclosure has been described above, the disclosure is not limited thereto but can be modified and changed in diverse ways within the scope of the appended claims.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-058481, filed Mar. 30, 2021, which is hereby incorporated by reference herein in its entirety.

What is claimed is:

1. A control apparatus comprising at least one processor and a memory coupled with the at least one processor that when executed by the processor, cause the processor to function as:
   a selection unit configured to acquire information indicating a focal length of an optical system, and select a drive mode for a first correction unit and a second correction unit from among a plurality of drive modes including a first drive mode and a second drive mode based on the information indicating the focal length, the first correction unit being configured to move an optical element included in the optical system to change a direction of an optical axis of the optical system, the second correction unit being configured to move a sensor in a plane perpendicular to the optical axis, the sensor being configured to capture a subject image formed by light passing through the optical system; and
   a control unit configured to drive the first correction unit and the second correction unit in the selected drive mode,
   wherein the selection unit selects the first drive mode in a case where the focal length is a first value, and selects the second drive mode in a case where the focal length is a second value larger than the first value,
   wherein in a case where the first drive mode is selected and a shake amount of an imaging apparatus including the sensor is equal to or smaller than a first threshold value, the control unit drives and controls the first correction unit based on the shake amount, and in a case where the first drive mode is selected and the shake amount is larger than the first threshold value, the control unit drives and controls the first correction unit and the second correction unit based on the shake amount, and
   wherein in a case where the second drive mode is selected, the control unit drives and controls the first correction unit and the second correction unit based on the shake amount and a predetermined drive ratio.

2. The control apparatus according to claim 1, wherein in a case where the first drive mode is selected, the control unit drives and controls the first correction unit so that a moving amount of the optical element is equal to or smaller than a correction amount corresponding to the first threshold value.

3. The control apparatus according to claim 2, wherein the correction amount corresponding to the first threshold value is a distance from a reference position of the optical element to a control end of the optical element that is controllable by the first correction unit.

4. The control apparatus according to claim 1, wherein in the case where the first drive mode is selected and the shake amount is larger than the first threshold value, the drive control unit drives and controls the second correction unit based on a correction amount corresponding to a difference between the shake amount and the first threshold value.

5. The control apparatus according to claim 1, wherein the selection unit selects the drive mode based on the focal length and distortion information about the optical system.

6. The control apparatus according to claim 5,
wherein in a case where the sensor is moved by a predetermined amount, the selection unit determines, based on the distortion information about the optical system, whether a difference in a moving amount of the sensor and the subject image between a central portion and a peripheral portion of a region of the sensor is equal to or smaller than a second threshold value,
wherein in a case where the focal length is the first value and the difference in the moving amount exceeds the second threshold value, the selection unit selects the first drive mode, and
wherein in a case where the focal length is the second value or in a case where the focal length is the first value and the difference in the moving amount is equal to or smaller than the second threshold value, the selection unit selects the second drive mode.

7. The control apparatus according to claim 1, further comprising a setting unit configured to set the drive ratio based on a position of the optical element at a timing when an imaging start instruction is received.

8. The control apparatus according to claim 1, further comprising a setting unit configured to set the drive ratio based on the focal length of the optical system at a timing when an imaging start instruction is received.

9. An imaging apparatus comprising:
the control apparatus according to claim 1;
the sensor; and
the second correction unit.

10. The imaging apparatus according to claim 9,
wherein a lens apparatus including the optical system is attachable to the imaging apparatus, and
wherein the first threshold value is changed depending on the lens apparatus attached to the imaging apparatus.

11. A lens apparatus comprising:
the control apparatus according to claim 1;
the optical system; and
the first correction unit.

12. A method for controlling a correction system, the method comprising:
acquiring information indicating a focal length of an optical system;
selecting a drive mode for a first correction unit and a second correction unit from among a plurality of drive modes including a first drive mode and a second drive mode based on the information indicating the focal length, the first correction unit being configured to move an optical element included in the optical system to change a direction of an optical axis of the optical system, the second correction unit being configured to move a sensor in a plane perpendicular to the optical axis, the sensor being configured to capture a subject image formed by light passing through the optical system; and
driving and controlling the first correction unit and the second correction unit in the selected drive mode,
wherein the first drive mode is selected in a case where the focal length is a first value, and the second drive mode different from the first drive mode is selected in a case where the focal length is a second value larger than the first value, and
wherein in a case where the first drive mode is selected and a shake amount of an imaging apparatus including the sensor is equal to or smaller than a first threshold value, the first correction unit is driven and controlled based on the shake amount, and in a case where the first drive mode is selected and the shake amount is larger than the first threshold value, the first correction unit and the second correction unit are driven and controlled based on the shake amount, and
in a case where the second drive mode is selected, the first correction unit and the second correction unit are driven and controlled based on the shake amount and a predetermined drive ratio.

* * * * *